(12) United States Patent
Laur et al.

(10) Patent No.: US 8,629,662 B2
(45) Date of Patent: *Jan. 14, 2014

(54) MULTIPLE PHASE SWITCHING REGULATOR WITH PHASE CURRENT SHARING

(71) Applicant: Intersil Americas LLC, Milpitas, CA (US)

(72) Inventors: Steven P. Laur, Raleigh, NC (US); Rhys S. A. Philbrick, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/772,085

(22) Filed: Feb. 20, 2013

(65) Prior Publication Data

US 2013/0154585 A1 Jun. 20, 2013

Related U.S. Application Data

(63) Continuation of application No. 12/878,529, filed on Sep. 9, 2010, now Pat. No. 8,405,368.

(60) Provisional application No. 61/317,761, filed on Mar. 26, 2010.

(51) Int. Cl.
*G05F 1/10* (2006.01)
*G05B 24/02* (2006.01)

(52) U.S. Cl.
USPC ............ 323/237; 323/240; 323/246; 323/320

(58) Field of Classification Search
USPC .................. 323/237–246, 212, 214, 320–327
See application file for complete search history.

(56) References Cited

U.S. PATENT DOCUMENTS

| 7,466,116 | B2 | 12/2008 | Sato et al. | |
|---|---|---|---|---|
| 7,589,511 | B2 | 9/2009 | Dong et al. | |
| 7,732,941 | B2 | 6/2010 | Cheung et al. | |
| 7,903,433 | B2 | 3/2011 | Carpenter et al. | |
| 8,405,368 | B2 * | 3/2013 | Laur et al. ..................... | 323/237 |
| 2007/0024253 | A1 * | 2/2007 | Schuellein et al. ........... | 323/246 |
| 2007/0296387 | A1 | 12/2007 | Dong et al. | |
| 2009/0058379 | A1 | 3/2009 | Sreenivas | |

FOREIGN PATENT DOCUMENTS

| JP | 2004-328996 | 11/2004 |
|---|---|---|
| JP | 2006-507785 | 3/2006 |

* cited by examiner

*Primary Examiner* — Jessica Han
(74) *Attorney, Agent, or Firm* — Gary Stanford

(57) ABSTRACT

A phase current sharing network that adjusts operation of a current mode multiphase switching regulator in which the phase current sharing network includes multiple synthetic ripple networks and a current share network. The regulator develops phase currents including ripple currents through corresponding phase inductors as controlled by corresponding pulse control signals. Each synthetic ripple networks develops a corresponding ripple voltage that simulates a corresponding phase ripple current and uses the ripple voltages to develop the pulse control signals. The current share network adjusts each ripple voltage by a combined adjustment value. The combined adjustment value is a combination of phase adjustment values in which each phase adjustment value is based on a difference between a corresponding one of ripple voltage and a reference voltage. Transconductance amplifiers may be used to convert the voltage differences to current adjust values applied to the ripple capacitors developing the ripple voltages.

20 Claims, 6 Drawing Sheets

US 8,629,662 B2

MULTIPLE PHASE SWITCHING REGULATOR WITH PHASE CURRENT SHARING

CROSS-REFERENCE TO RELATED APPLICATIONS

This application is a continuation of currently pending U.S. application Ser. No. 12/878,529 filed on Sep. 9, 2010, which itself claims the benefit of U.S. Provisional Application Ser. No. 61/317,761, filed on Mar. 26, 2010, and in which both are hereby incorporated by reference in their entireties for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
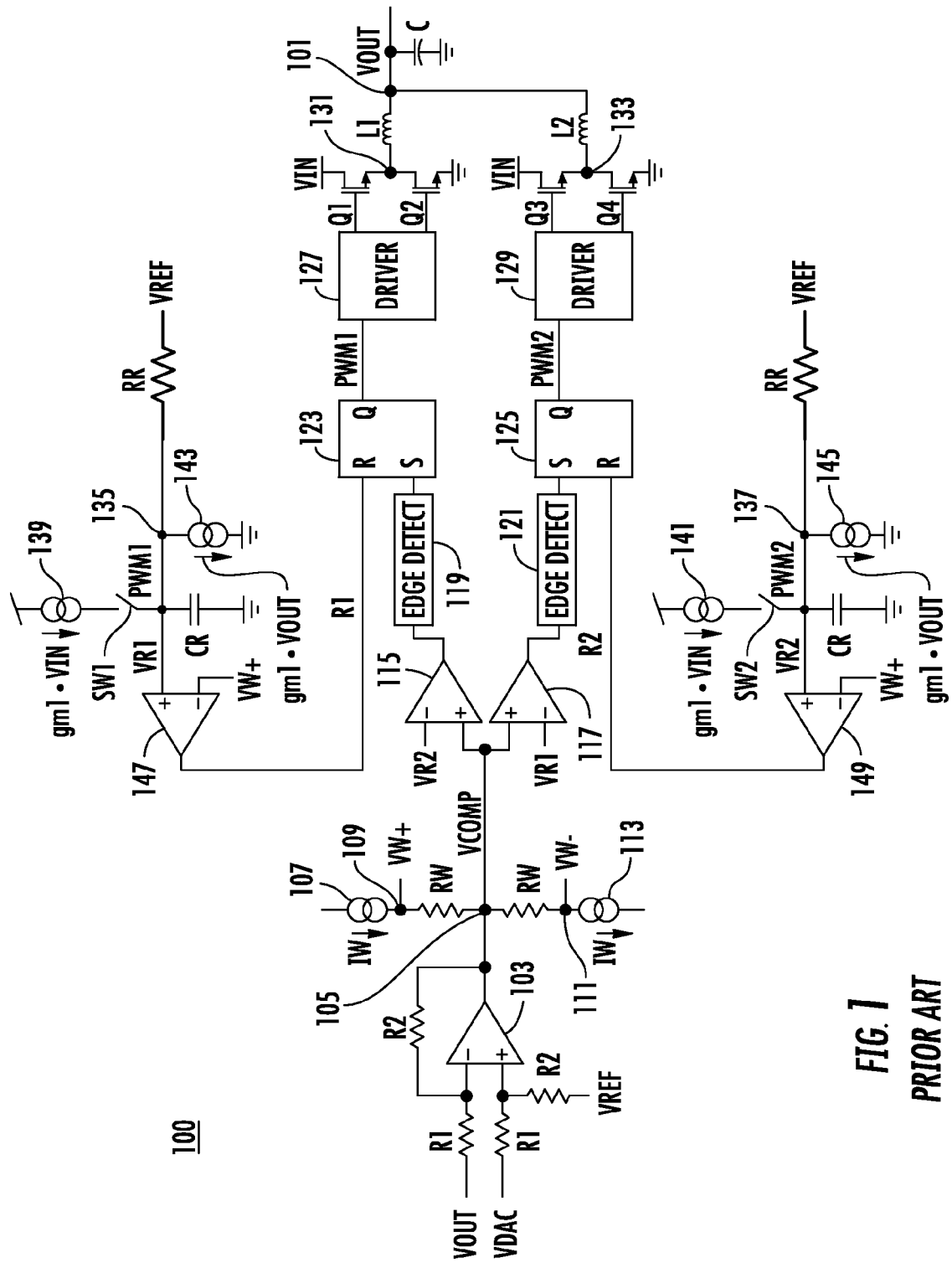
FIG. 1 is a schematic diagram of a conventional multiple phase (or multiphase) switching regulator using synthetic ripple regulation.

FIG. 1 is a schematic diagram of a conventional multiple phase (or multiphase) switching regulator 100 using synthetic ripple regulation. The switching regulator 100 is shown including 2 phase networks, where it is understood that any suitable number of phases may be included. An output node 101 develops an output voltage VOUT which is fed back to an inverting input of an error amplifier 103 through a first resistor R1. A voltage VDAC is provided through a second resistor R1 to a non-inverting input of the error amplifier 103, which has an output developing a compensation voltage VCOMP on a compensation node 105. VDAC has a voltage level indicative of the target voltage level for VOUT. The first and second resistors R1 have substantially the same resistance. A first resistor R2 is coupled between the inverting input and output of the error amplifier 103. A reference voltage VREF is provided to one end of a second resistor R2, having its other end coupled to the non-inverting input of the error amplifier 103. The first and second resistors R2 have substantially the same resistance. A first current source 107 provides a window current IW into one end of a first window resistor RW at a positive window node 109 which develops a positive window voltage VW+. The other end of the first window resistor RW is coupled to node 105, which is further coupled to one end of a second window resistor RW having its other end coupled to a negative window node 111 which develops a negative window voltage VW−. A current sink 113 sinks the window current IW from node 111. The first and second window resistors RW each have substantially the same resistance so that the window voltages VW+ and VW− are offset from the compensation node 105 by substantially the same amount in a balanced window voltage configuration.

The compensation node 105 is coupled to the non-inverting input of each of a pair of comparators 115 and 117. The inverting input of comparator 115 receives a ripple voltage VR2 and the inverting input of comparator 117 receives another ripple voltage VR1. The output of the comparator 115 is coupled to the input of an edge detect module 119 and the output of the comparator 117 is coupled to the input of another edge detect module 121. The output of the edge detect module 119 is provided to the set (S) input of a set-reset flip-flop (SRFF) 123 and the output of the edge detect module 121 is provided to the set (S) input of another SRFF 125. SRFF 123 has a Q output providing a first pulse-width modulation (PWM) signal PWM1 and SRFF 125 has a Q output providing a second PWM signal PWM2. PWM1 is provided to the input of a first switch driver module 127 and PWM2 is provided to the input of a second switch driver module 129. The first switch driver module 127 controls a first switch network including electronic switches Q1 and Q2 and the second switch driver module 129 controls a second switch network including electronic switches Q3 and Q4. In one embodiment, the electronic switches Q1-Q4 are each N-channel field-effect transistor (FET) devices (e.g., metal-oxide semiconductor FET or MOSFET), although alternative types of switching devices are contemplated, such as other N-type or P-type devices or the like. The driver modules 127 and 129 are configured according to the switch type. In one embodiment, the drains of Q1 and Q3 are coupled to an input voltage VIN, the sources of Q2 and Q4 are coupled to a reference node, such as ground (GND), the source of Q1 and the drain of Q2 are coupled to a first phase node 131 of the first phase network, and the source of Q3 and the drain of Q4 are coupled to a second phase node 133 of the second phase network. The gates of Q1 and Q2 are coupled to the first switch driver module 127 and the gates of Q3 and Q4 are coupled to the second switch driver module 129. A first inductor L1 is coupled between the first phase node 131 and the output node 101 and a second inductor L2 is coupled between the second phase node 133 and the output node 101. A filter capacitor C is coupled between output node 101 and GND.

VREF is provided to one end of a first ripple resistor RR and to one end of a second ripple resistor RR. The first and second ripple resistors RR have substantially the same resistance. The other end of the first ripple resistor RR is coupled to a first ripple node 135 developing the first ripple voltage VR1, and the other end of the second ripple resistor RR is coupled to a second ripple node 137 developing the second ripple voltage VR2. A first ripple capacitor CR is coupled between the first ripple node 135 and GND, and a second ripple capacitor CR is coupled between the second ripple node 137 and GND. The first and second ripple capacitors CR have approximately the same capacitance. A first current source 139 provides a current gm1·VIN to a first switched terminal of a first switch SW1, which has a second switched terminal coupled to the first ripple node 135 (in which a dot symbol "·" denotes multiplication). The term "gm1" is a transconductance gain which is multiplied by the input voltage VIN to develop a current proportional to the input voltage VIN. A second current source 141 provides substantially the same current gm1·VIN to a first switched terminal of a second switch SW2, which has a second switched terminal coupled to the second ripple node 137. PWM1 controls the switch SW1 and PWM2 controls the switch SW2. In each case, the respective switch is closed when the corresponding PWM signal is high and is opened when the PWM signal is low. A first current sink 143 sinks a current gm1·VOUT from the first ripple node 135 to GND and a second current sink 145 sinks substantially the same current gm1·VOUT from the second ripple node 137 to GND. The transconductance gain gm1 is multiplied by the output voltage VOUT to develop a current proportional to the output voltage VOUT. The first ripple node 135 is coupled to the non-inverting input of a first comparator 147, which has an inverting input receiving the positive window voltage VW+. The output of the first comparator 147 provides a first reset signal R1 to the reset (R) of the SRFF 123. The second ripple node 137 is coupled to the non-inverting input of a second comparator 149, which has an inverting input receiving the positive window voltage VW+. The output of the second comparator 149 provides a second reset signal R2 to the reset (R) of the SRFF 125.

In operation of the switching regulator 100, the PWM1 and PWM2 signals each toggle high and low to control switching operation of the first and second phases, respectively. When the SRFF 123 asserts PWM1 high, the switch driver circuit 127 turns on the switch Q1 and turns off the switch Q2 so that VIN is effectively coupled to the first phase node 131. When PWM1 goes low, the switch driver module 127 turns off the switch Q1 and turns on the switch Q2 so that the first phase node 131 is effectively coupled to GND. As PWM1 toggles high and low over multiple switching cycles, the switch driver module 127 and the switches Q1 and Q2 toggle coupling of the phase node 131 between VIN and GND to convert the input voltage VIN to the output voltage VOUT through the first output inductor L1 for the first phase network. The SRFF 125, the switch driver module 129, the switches Q3 and Q4 and the output inductor L2 operate in substantially similar manner for the second phase network. The two phase networks alternate in activation in an attempt to equally share current load to the output node 101 for driving a load (not shown). The switching regulator 100 operates as a buck regulator in which the input voltage VIN is greater than the output voltage, although boost regulators in which VOUT is greater than VIN are also contemplated.

The current sinks 143 and 145 each draw a substantially constant current gm1·VOUT from the ripple nodes 135 and 137, respectively, drawing charge from the first and second ripple capacitors CR, respectively. When VR1 is greater than VREF, an additional current flows from node 135 through the first ripple resistor RR and when VR1 drops below VREF, additional charge current flows from VREF through the first ripple resistor RR. When PWM1 is high, the first phase network drives current to the output node 101. Also, when PWM1 is high, switch SW1 is closed so that the current gm1·VIN from the current source 139 flows to node 135 to charge the first ripple capacitor CR. While switch SW1 is closed, VR1 rises relatively quickly until it reaches the level of VW+. When VR1 rises above VW+, the comparator 147 pulls R1 high to reset the SRFF 123, which pulls PWM1 low. When PWM1 goes low, switch SW1 is opened so that the ripple voltage VR1 starts to ramp down at a relatively constant rate. When the voltage VR1 drops to the level of VCOMP, the comparator 117 asserts its output high to the edge detect circuit 121, which triggers to assert a high or positive pulse to the set input of the SRFF 125. In response to the pulse on its set input, the SRFF 125 pulls PWM2 high. When PWM2 is high, the second phase network drives current to the output node 101. Also, when PWM2 is high, switch SW2 is closed so that the current gm1·VIN from the current source 141 flows to node 137 to charge the second ripple capacitor CR. The second phase operates in substantially the same manner as the first phase, so that VR2 rises while SW2 is closed. When SW2 exceeds the level of VW+, the comparator 149 pulls R2 high to reset SRFF 125 which pulls PWM2 back low. The ripple voltage VR2 ramps down at a relatively constant rate until it falls below VCOMP, and then the comparator 115 asserts its output high causing the edge detect module 119 to pulse the set input of SRFF 123 high to re-assert PWM1 high again. Operation repeats in this manner so that the first and second phase networks alternatively activate to drive current to the output node 101.

The switching regulator 100 is shown with only two phase networks alternatively driving the output. As previously described, additional phase networks may be included. For additional phase networks, each phase network triggers activation of the next up to the last phase circuit, which triggers activation of the first phase network in round-robin fashion. Thus, the first phase network triggers activation of the second phase network, which triggers activation of the next or last phase network, and so on, in which the last phase network triggers activation of the first phase network in round-robin fashion for a balanced configuration between the phase networks. The switching regulator 100 has a balanced configuration in which the loop compensation is substantially reduced or eliminated resulting in significantly greater speed as compared to loop compensation-based configurations. The increased speed, however, results in a corresponding reduction or minimization of natural phase current sharing between the phase networks. This is caused by the reduction in resistance of the ripple resistor RR to achieve increased transient speed and reduced modulator output impedance. In particular, the resistance of RR is reduced to reduce output impedance of the modulator and increase transient response, which causes the synthetic current waveform to diverge from the inductor current. As described further below, the "synthetic current waveform" is a ripple voltage developed across a corresponding ripple capacitor which attempts to replicate the ripple current through the corresponding output inductor and which is used to control switching of a corresponding PWM signal. This divergence of the synthetically developed current, particularly during transient events, causes a significant difference in output current between the phase networks. Thus, the reduction of the ripple resistance RR causes alternating current (AC) information to lose some of its proportionality to the inductor current. The mismatch is especially apparent during transient conditions, such as significant load changes. Thus, the switching regulator 100 loses the inherent high frequency current balance as compared to normal synthetic ripple regulators. An imbalance of current sharing means that one or more phase networks contribute significantly more to the load current than the remaining phase networks, which effectively defeats the purposes and benefits of current sharing between multiple phases.

Various methods have been tried to regain the high frequency current balance between the multiple phase circuits. One approach is to provide a very high bandwidth current balance loop. The problem with this approach is that the very high bandwidth current balance loop is very difficult to stabilize. Another approach is to use an open-loop algorithm for phase firing in an attempt to balance the currents. One problem with this approach are potential coverage issues since the algorithm is difficult to achieve and may not be sufficiently flexible. Such an algorithm may require tuning based on phase count and/or other system parameters on a case-by-case basis.

Synthetic ripple regulation is a method of synthetically generating a ripple voltage indicative of the ripple current through the output inductor (e.g., L1 or L2) rather than by direct measurement or indirect measurement by other means. As understood by those of ordinary skill in the art, the current waveform through a voltage-driven inductor is similar to the voltage waveform across a current-driven capacitor. Thus, driving a "ripple" capacitor (e.g., CR) with a current proportional to the voltage across the output inductor provides the desired waveform shape. The voltage of the phase node 131 applied at one end of output inductor L1, for example, is generally the input voltage VIN when Q1 is on and Q2 is off (when PWM1 is high), and is zero (GND) when Q2 is on and Q1 is off. The current source 139 generates the VIN proportional current gm1·VIN, which is applied to capacitor CR when PWM1 is high closing switch SW1. When PWM1 is low opening switch SW1, this current is removed from capacitor CR thus simulating 0 Volts (V). The voltage of the output node 101 at the other end of L1 is VOUT. The current sink 143 generates the VOUT proportional current gm1·VOUT, which is continuously applied to capacitor CR. In this manner, the ripple capacitor CR is driven with a collective current which is proportional to the voltage applied across the output inductor L1, so that the ripple voltage VR1 develops the desired ripple waveform shape. Thus, the ripple voltage VR1 effectively replicates the waveform ripple current through the output inductor L1, and VR1 is used to control toggling of the PWM1 signal controlling the first phase. The ripple voltage VR2 is developed in a similar manner to control toggling of the PWM2 signal for the second phase. Additional phase networks, if provided, are controlled in a similar manner for synthetic ripple regulation.

Figure 2:
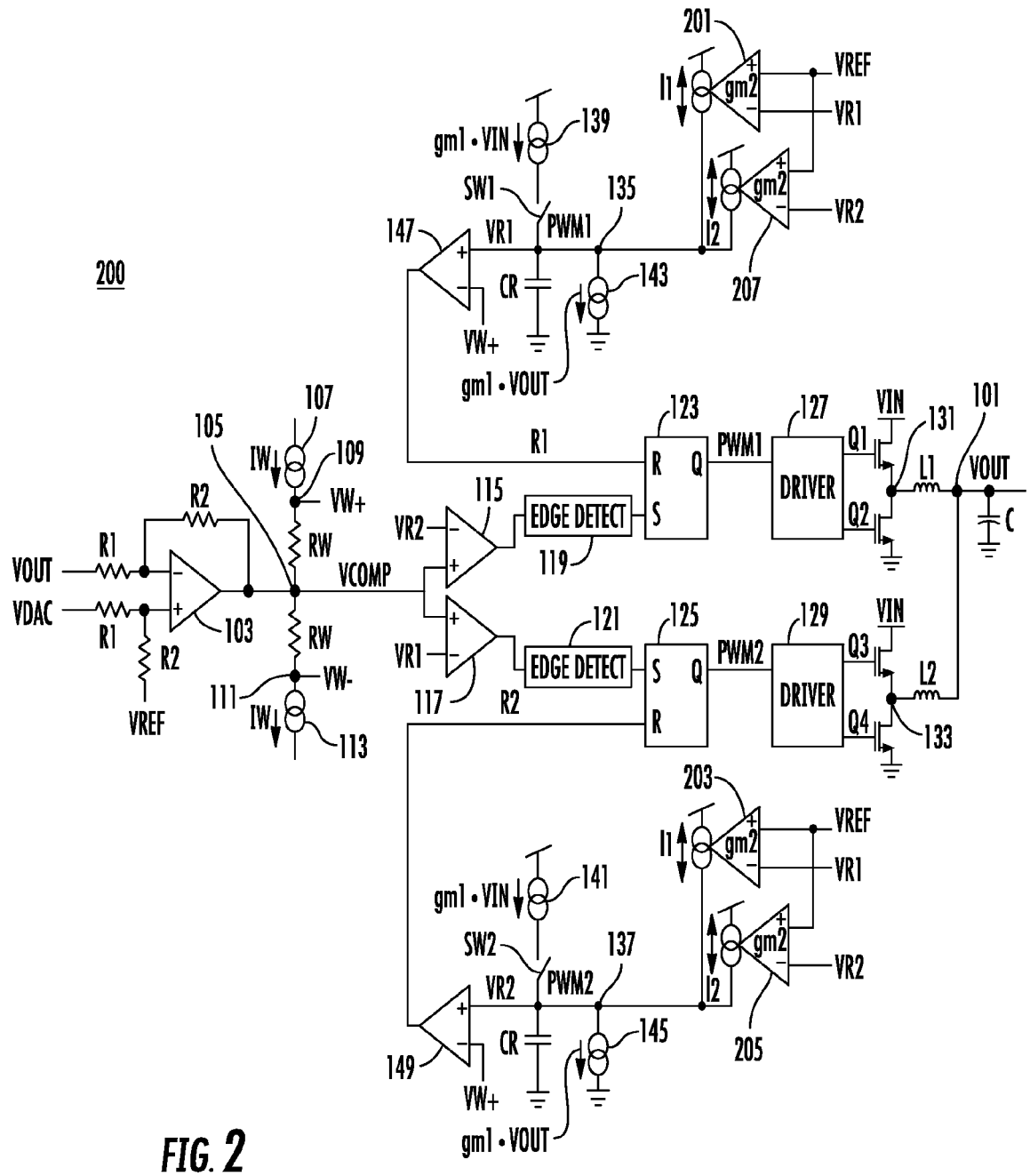
FIG. 2 is schematic diagram of a multiphase switching regulator according to one embodiment using synthetic ripple regulation with phase current sharing between two phases.

FIG. 2 is schematic diagram of a multiphase switching regulator 200 according to one embodiment using synthetic ripple regulation with phase current sharing between two phases. The switching regulator 200 has some similar features as the multiphase switching regulator 100 in which similar devices or components assume identical reference numerals. Operation of the switching regulator 200 is similar to that of the switching regulator 100, except that the switching regulator 200 includes improved current sharing between the phase networks as further described herein. The switching regulator 200 is also shown with two phase networks in which it is understood that any suitable number of phase networks (i.e., more than two) may be included. The first ripple resistor RR of the first phase network is replaced with a transconductance amplifier 201 having a non-inverting input receiving VREF, an inverting input receiving the first phase ripple voltage VR1, and an output coupled to the first ripple node 135. As understood by those of ordinary skill in the art, a transconductance amplifier converts an input voltage to an output current. The transconductance amplifier 201 has a transconductance gain of gm2 in which it amplifies the difference between the input voltages VREF and VR1 by gm2 to provide an output current I1. The output current I1 is applied to the first ripple node 135. In this manner, the current I1 is developed according to the equation I1=gm2(VREF−VR1) and the current I1 is applied to the first ripple node 135. The output impedance of the transconductance amplifier 201 is essentially constant. In one embodiment, the gain gm2 is tuned to match the value of the replaced ripple resistor RR. In this manner, the transconductance amplifier 201 effectively simulates the function of the first ripple resistor RR coupled between the voltages VREF and VR1 for the first phase network.

Another transconductance amplifier 203 with substantially the same transconductance gain gm2 is provided and configured in substantially the same manner as the transconductance amplifier 201, except having its output coupled to the second ripple node 137. In particular, the transconductance amplifier 203 has a non-inverting input receiving VREF, an inverting input receiving the first phase ripple voltage VR1, and an output coupled to the second ripple node 137. In this manner, the output of the transconductance amplifier 203 develops substantially the same current I1 which is applied to the second ripple node 137 for current sharing purposes between the first and second phase networks. In a similar manner, another transconductance amplifier 205 is provided having a non-inverting input receiving VREF, an inverting input receiving the second phase ripple voltage VR2, and an output coupled to the second ripple node 137. The transconductance amplifier 205 also has substantially the same transconductance gain gm2 in which it amplifies the difference between the input voltages VREF and VR2 by gm2 to provide an output current I2 which is applied to the second ripple node 137. In this manner, the current I2 is developed according to the equation I2=gm2(VREF−VR2) and the current I2 is applied to the second ripple node 137. As before, in one embodiment, the gain gm2 is tuned to match the value of the replaced ripple resistor RR, so that the transconductance amplifier 205 effectively simulates the function of the second ripple resistor RR coupled between the voltages VREF and VR2 for the second phase network. Furthermore, yet another transconductance amplifier 207 with substantially the same transconductance gain gm2 is provided and configured in substantially the same manner as the transconductance amplifier 205, except having its output coupled to the first ripple node 135. In particular, the transconductance amplifier 207 has a non-inverting input receiving VREF, an inverting input receiving the second phase ripple voltage VR2, and an output coupled to the first ripple node 135. In this manner, the output of the transconductance amplifier 207 develops substantially the same current I2 which is applied to the first ripple node 135 for current sharing purposes between the first and second phase networks.

Figure 3:
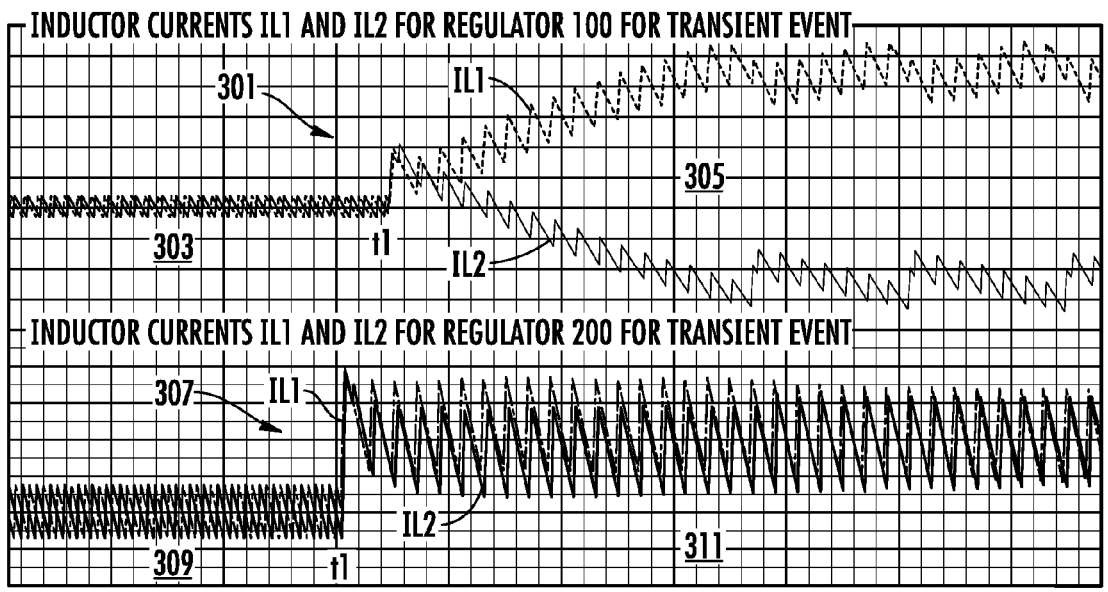
FIG. 3 is a timing diagram illustrating inductor currents of output inductors for both of the multiphase switching regulators of FIGS. 1 and 2, respectively, during a transient event.

FIG. 3 is a timing diagram illustrating inductor currents IL1 and IL2 of inductors L1 and L2, respectively, for both of the multiphase switching regulators 100 and 200, respectively, during a transient event. The upper pair of curves shown at 301 illustrate the inductor currents IL1 and IL2 for the multiphase switching regulator 100 before and after a transient event at time t1. The inductor currents IL1 and IL2 track each other fairly closely before time t1 as shown at 303. After the transient event at time t1, however, the inductor currents IL1 and IL2 diverge significantly from each other as shown at 305. In this manner, the first phase network of the switching regulator 100 provides significantly more current in response to the transient event. In contrast, the lower pair of curves shown at 307 illustrate the inductor currents IL1 and IL2 for the multiphase switching regulator 200 before and after the transient event at time t1. The inductor currents IL1 and IL2 track each other fairly closely before time t1 as shown at 309. After the transient event at time t1, the inductor currents IL1 and IL2 still track each other fairly closely as shown at 311. In this manner, the both phase networks of the switching regulator 200 share current load during steady state operation and in response to transient events.

Figure 4:
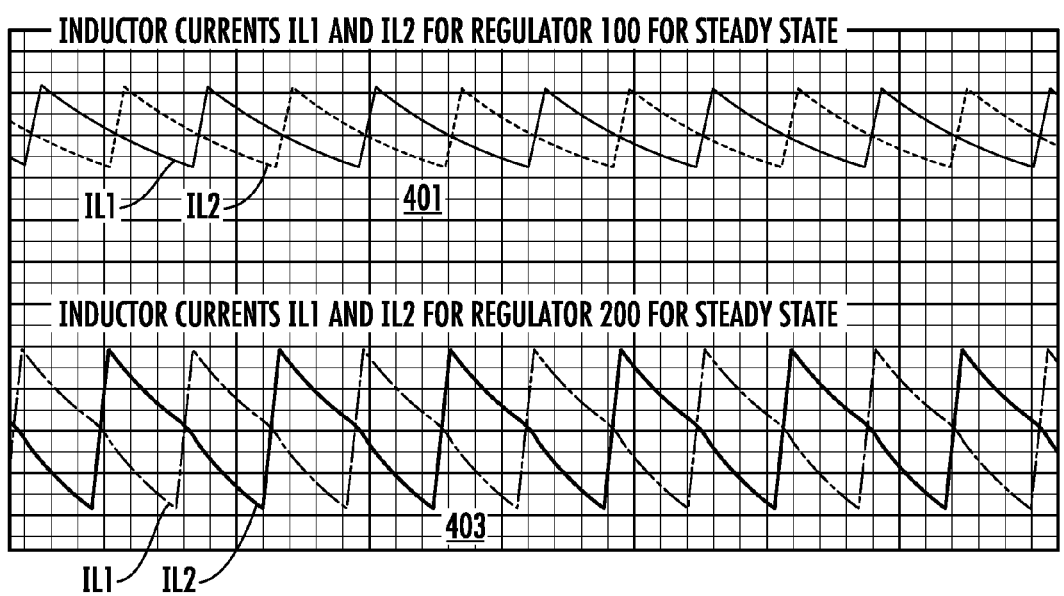
FIG. 4 is a timing diagram illustrating inductor currents of the output inductors for both of the multiphase switching regulators of FIGS. 1 and 2, respectively, during steady state operation.

FIG. 4 is a timing diagram illustrating inductor currents IL1 and IL2 of inductors L1 and L2, respectively, for both of the multiphase switching regulators 100 and 200, respectively, during steady state operation. The upper pair of curves shown at 401 illustrate the inductor currents IL1 and IL2 for the multiphase switching regulator 100 and the lower pair of curves shown at 403 illustrate the inductor currents IL1 and IL2 for the multiphase switching regulator 200. Current sharing is shared for both regulators 100 and 200 during the steady state conditions. Although the current sharing appears balanced and symmetric for both switching regulators 100 and 200, current sharing is significantly more balanced and symmetric over time for the switching regulator 200 over time particularly after transient events as illustrated in FIG. 3.

Figure 5:
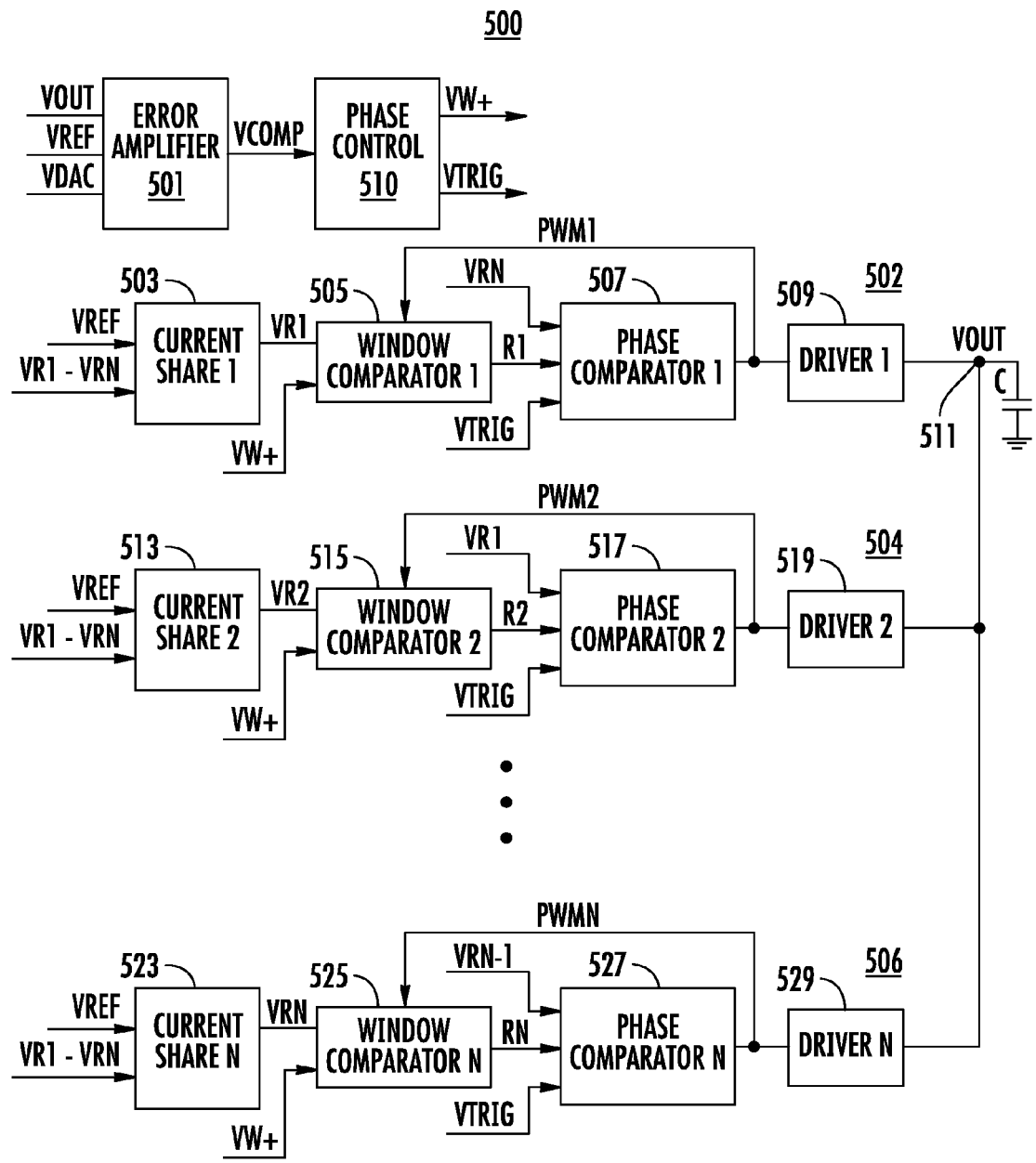
FIG. 5 is simplified block diagram of a multiphase switching regulator according to one embodiment using synthetic ripple regulation with phase current sharing between any number "N" of phases.

FIG. 5 is simplified block diagram of a multiphase switching regulator 500 according to one embodiment using synthetic ripple regulation with phase current sharing between any number "N" of phases. N is any positive integer greater than one. The multiphase switching regulator 500 includes a common error amplifier module 501 which receives the VOUT, VREF and VDAC voltages and which provides the VCOMP voltage in a similar manner as described for error amplifier 103 of the multiphase switching regulator 200. In fact, similar circuitry as that show for the error amplifier 103 may be used. VCOMP may be used as the trigger voltage point for two phases. For N>2, however, a different trigger voltage VTRIG is determined based on VCOMP and N by a phase control network 510. The window voltage range is expressed as $\Delta VW = VW+ - VW-$, which is the hysteretic window voltage in which VCOMP is centered between VW+ and VW-. For the general case, VTRIG is determined as $VTRIG = VCOMP + \Delta VW(N-2)/N$, where $\Delta VW = 2(VW+ - VCOMP)$. It is noted that VTRIG=VCOMP for N=2. VTRIG is distributed to the N phase networks, shown as a first phase network 502, a second phase network 504, and so on up to the Nth or last phase network 506. The phase networks 502-506 are coupled to a common output node 511 developing an output voltage VOUT and having an output capacitor C coupled between node 511 and ground in a similar manner as the multiphase switching regulator 200.

The first phase network 502 includes a current share 1 module 503, a window comparator 1 module 505, a phase comparator 1 507, and a driver 1 module 509. The current share 1 module 503 receives VREF and the ripple voltages VR1, VR2, ..., VRN (VR1-VRN) and has an output coupled to a node developing the first ripple voltage VR1. The current share 1 module 503 may be implemented in a similar manner as the transconductance amplifiers 201 and 207 of the multiphase switching regulator 200, except including N amplifiers. The window comparator 1 module 505 is coupled to the node developing VR1, receives a first pulse-width modulation (PWM) signal PWM1 and the window voltage VW+, and provides a first reset signal R1 to the phase comparator 1 module 507. The window comparator 1 module 505 may be implemented in a similar manner as shown for the multiphase switching regulator 200 including the current source 139, the current sink 143, the switch SW1, and ripple capacitor CR and the comparator 147. The phase comparator 1 module 507 receives the ripple voltage VRN of the last or Nth phase 506, VTRIG and R1, and develops the PWM1 signal for the first phase network 502 provided to the window comparator 1 module 505 and the driver 1 module 509. The phase comparator 1 module 507 may be implemented in a similar manner as shown for the multiphase switching regulator 200 including the comparator 115, the edge detect circuit 119, and the SRFF 123. The driver 1 module 509 receives PWM1 and drives VOUT on the output node 511 according to multiphase operation. The driver 1 module 509 may be implemented in a similar manner as shown for the multiphase switching regulator 200 including the switch driver circuit 127, the switches Q1 and Q2, and the inductor L1.

The second phase network 504 includes a current share 2 module 513, a window comparator 2 module 515, a phase comparator 2 module 517, and a driver 2 module 519. The current share 2 module 513 is substantially similar to the current share 1 module 503, except coupled to the node developing the second ripple voltage VR2 for the second phase. The window comparator 2 module 515 is substantially similar to the window comparator 1 module 505, except coupled to VR2, receiving PWM2, and providing R2. The phase comparator 2 module 517 is substantially similar to the phase comparator 1 module 507 except receiving R2 and the ripple voltage VR1 from the first phase network 502 and providing PWM2. The driver 2 module 519 is substantially similar to the driver 1 module 509 except responsive to PWM2 for driving the VOUT voltage. Each phase network is similarly configured up to the last phase network 506, which includes a current share N module 523, a window comparator N module 525, a phase comparator N module 527, and a driver N module 529. As previously described, each phase network triggers activation of the next up to the last phase network, which triggers activation of the first phase network in round-robin fashion. Thus, VR1 from the first phase network 502 is provided to activate the second phase network 504, and so on up to VRN-1 from the second to last phase network being provided to activate the last phase network 506. Further, VRN from the last phase network 506 is provided to activate the first phase network 502 in round-robin fashion.

Figure 6:
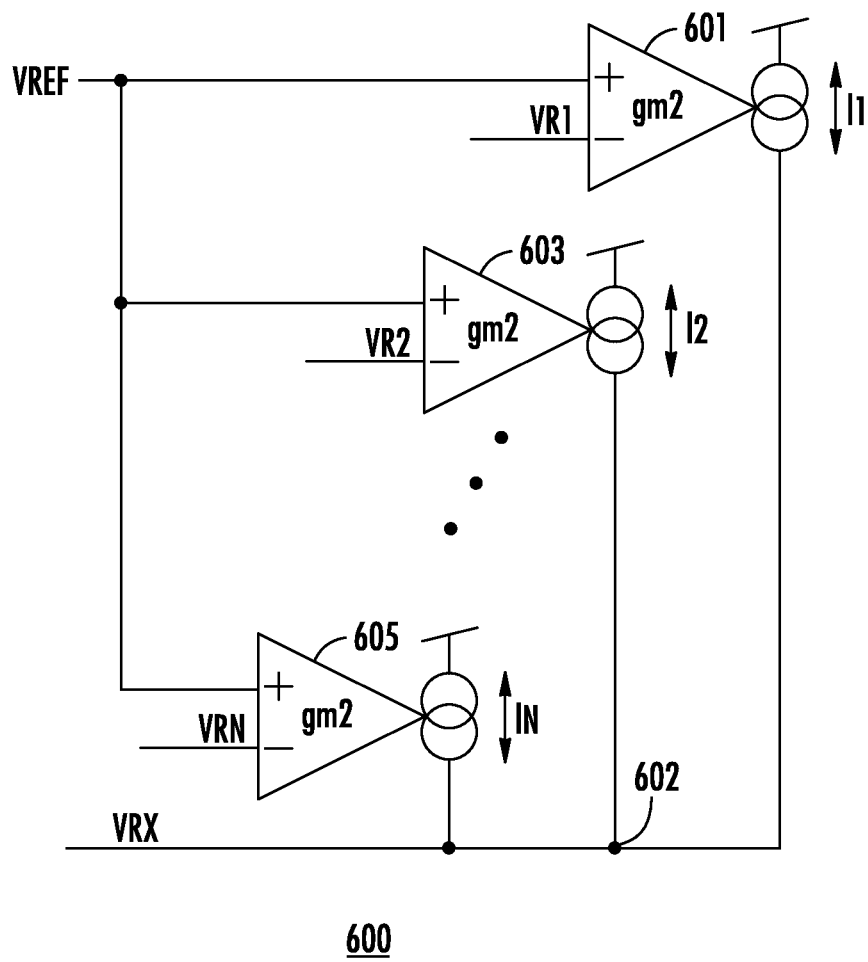
FIG. 6 is a schematic diagram of an exemplary current share module, which may be used to implement any of the current share modules of the multiphase switching regulator of FIG. 5.

FIG. 6 is a schematic diagram of an exemplary current share module 600, which may be used to implement any of the current share modules 503, 513, ..., 523 of the multiphase switching regulator 500. VREF is provided to the non-inverting input of each of a series of N transconductance amplifiers 601, 603, ..., 605 (601-605). The outputs of the transconductance amplifiers 601-605 are coupled together at a common ripple node 602 developing a corresponding one of the ripple voltages VR1-VRN, shown generally as VRX (where "X" denotes any phase number from 1 to N). The first transconductance amplifier 601 has an inverting input receiving the first phase ripple voltage VR1, the second transconductance amplifier 603 has an inverting input receiving the second phase ripple voltage VR2, and so on up to the last transconductance amplifier 605, which has an inverting input receiving the last phase ripple voltage VRN. The output of the first transconductance amplifier 601 develops a current I1 for modifying voltage of VRX on node 602 based on the voltage difference between VREF and VR1 multiplied by gain gm2, or I1=gm2*(VREF−VR1), the output of the second transconductance amplifier 603 develops a current I2 for modifying voltage of VRX based on the voltage difference between VREF and VR2 multiplied by gain gm2, or I2=gm2*(VREF−VR2), and so on up to the output of the last transconductance amplifier 603, which develops a current IN for modifying voltage of VRX based on the voltage difference between VREF and VRN multiplied by gain gm2, or IN=gm2*(VREF−VRN). This same circuit is repeated as the current share module for each phase.

The gain gm2 of each of the transconductance amplifiers 601, 603, ..., 605 (601-605) may be adjusted to any suitable value depending upon the particular implementation. In one embodiment, the gain gm2 is configured to average the phase currents of all of the phases, in which the average current value is effectively subtracted from the ripple voltage of each phase network. As shown in FIG. 2, for example, each ripple voltage, such as VR1, is primarily developed based on the value of the ripple capacitor CR, the output voltage VOUT and the input voltage VIN when the corresponding pulse control signal, e.g., PWM1, is active (closing the switch SW1). The ripple voltage VR1 is adjusted based on the I1-IN currents, which collectively represent the average phase current through the output inductors. Since the ripple voltage VRX of each phase network is adjusted or modified in this manner based on the phase currents, the ripple voltages VR1-VRN are modified or adjusted ripple voltages. Each ripple voltage is a current control value used to control switching of a corresponding one of the phase networks.

In an alternative embodiment, the duplicate transconductance amplifier circuit provided in the other phase circuits may be replaced with a current mirror circuit or the like. In one embodiment, the current share module of each phase includes a single transconductance amplifier comparing VREF with the ripple voltage of that phase VRX, and providing the current adjust output IX to the corresponding ripple node. Further, one or more current mirrors or the like are provided within the current share module of each phase to mirror IX into the ripple node of every other phase of the multiphase switching regulator. For example, with reference to FIG. 2, the transconductance amplifier 203 may be replaced with a current mirror circuit (not shown) having an input coupled to the output of the transconductance amplifier 201 for receiving the current I1 and an output coupled to the second ripple node 137 for mirroring the current I1 to the second ripple node 137. Likewise, the transconductance amplifier 207 may be replaced with a current mirror circuit (not shown) having an input coupled to the output of the transconductance amplifier 205 for receiving the current I2 and an output coupled to the first ripple node 135 for mirroring the current I2 to the first ripple node 135. In this manner, each phase circuit includes one transconductance amplifier and a current mirror for each additional phase circuit in the multiphase configuration to mirror the current into every other ripple node.

In summary, for the synthetic ripple regulator embodiments, the ripple resistor coupled between each ripple voltage node of every phase circuit and a reference voltage is replaced with a transconductance amplifier tuned to essentially simulate or match the same current otherwise developed through the ripple resistor. Then this current is mirrored and applied to the ripple node of every other phase circuit. The current mirroring is implemented using additional duplicate transconductance amplifiers or current mirror circuits or the like. In this manner, each phase circuit has substantially the same current sharing circuit coupled to its ripple node.

Figure 7:
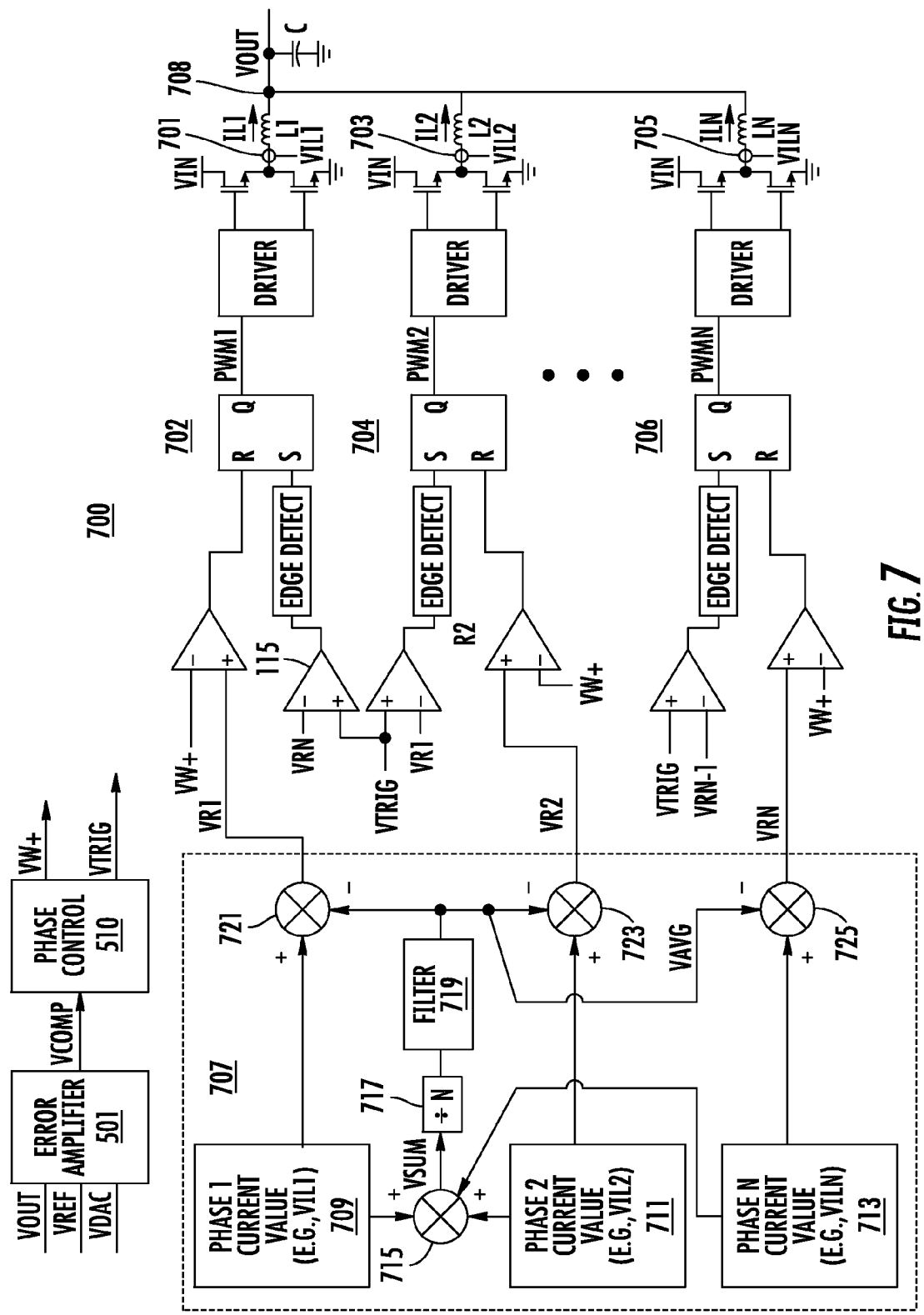
FIG. 7 is simplified schematic and block diagram of a multiphase switching regulator according to another embodiment with phase current sharing between any number "N" of phases.

FIG. 7 is simplified schematic and block diagram of a multiphase switching regulator 700 according to another embodiment with phase current sharing between any number "N" of phases, again in which N is any positive integer greater than one. The multiphase switching regulator 700 may include the common error amplifier module 501 which receives the VOUT, VREF and VDAC voltages and which provides the VCOMP voltage in a similar manner as previously described. VCOMP may be used as the trigger voltage point for two phases. For N>2, however, a different trigger voltage VTRIG is determined based on VCOMP and N by a phase control network 510 in a similar manner as previously described. VTRIG is distributed to each of the N phase networks, shown as a first phase network 702, a second phase network 704, and so on up to the last or Nth phase network 706. The phase networks 702-706 are coupled to a common output node 708 developing an output voltage VOUT. An output capacitor C is coupled between node 708 and ground for filtering VOUT in a similar manner as previously described. The phase networks 702-706 may be configured to operate in substantially similar manner as the multiphase switching regulator 200 and are not further described. In one embodiment, the phase currents IL1, IL2, ..., ILN through the output inductors L1, L2, ..., LN, respectively, are measured using current sensors 701, 702, ..., 705 as shown, providing corresponding current sense voltages VIL1, VIL2, ..., VILN, respectively. Thus, VIL1 is a voltage value proportional to phase current IL1, VIL2 is a voltage value proportional to phase current IL2, and so on up to VILN, which is a voltage value proportional to phase current ILN. The current sensors 701, 702, ..., 705 may be implemented in any suitable manner as understood by those skilled in the art, such as series-coupled resistors or the like, or filter circuits coupled to the output inductors, or any other suitable method for measuring the phase network currents.

The multiphase switching regulator 700 includes a phase current sharing network 707 for sharing current among the N phase networks. The phase current sharing network 707 includes a phase current value module for each phase network, including a phase 1 current value module 709 for the first phase network 702, a phase 2 current value module 711 for the second phase network 704, and so on up to a phase N current value module 713 for the Nth phase network 706. Each of the phase current value modules 709, 711, ..., 713 develops or otherwise conveys a corresponding phase current value for the respective phase network depending upon the particular method of determining phase current. In one embodiment, the phase current value modules 709, 711, ..., 713 are coupled to the current sensors 701, 702, ..., 705, respectively, for receiving and conveying the "real" current values VIL1-VILN directly or indirectly measured by the current sensors. In an alternative embodiment, the phase current value modules 709, 711, ..., 713 develop corresponding synthetic current values, such as developing and providing the synthetic current waveforms in a similar manner previously described for the multiphase switching regulator 200. In any case, the phase current values from the phase current value modules 709, 711, ..., 713 are provided to respective inputs of a combiner 715 (e.g., adder), which adds the phase current values together to provide a phase current sum value, shown as VSUM. VSUM output from the combiner 715 is provided to the input of a divider module 717, which divides VSUM by the number of phases, or N, and provides a corresponding average phase current value to a filter 719, such as a low pass filter (LPF) or the like. The filter 719 provides an average phase current value VAVG to the inverting input of each of a series of combiners 721, 723, ..., 725 for the phase networks 702, 704, ..., 706, respectively. Each phase current value from the phase current value modules 709, 711, ..., 713 is provided to a non-inverting input of a corresponding one of the combiners 721, 723, ..., 725, which output the VR1-VRN values, respectively. The VR1-VRN values are provided to the non-inverting inputs of corresponding comparators for each of the phase networks in a similar manner previously described.

Although the present invention has been described in considerable detail with reference to certain preferred versions thereof, other versions and variations are possible and contemplated. As an example, although certain embodiments are described for hysteretic current mode regulators, the present invention applies to any type of current mode controlled regulator. Those skilled in the art should appreciate that they can readily use the disclosed conception and specific embodiments as a basis for designing or modifying other structures for providing out the same purposes of the present invention without departing from the spirit and scope of the invention as defined by the following claim(s).

The invention claimed is:

1. A phase current sharing network configured to adjust operation of a current mode multiphase switching regulator, wherein the multiphase switching regulator includes a plurality of switching networks in which each switching network develops a corresponding one of a plurality of phase currents including a corresponding plurality of phase ripple currents through an inductor of each of a plurality of switching phase networks controlled by a corresponding one of a plurality of pulse control signals for converting an input voltage to an output voltage, said phase current sharing network comprising:

a plurality of synthetic ripple networks, wherein each of said plurality of synthetic ripple networks is configured to develop a corresponding one of a plurality of ripple voltages that simulates a corresponding one of the plurality of phase ripple currents;

wherein each of said plurality of ripple voltages is used to develop a corresponding one of the plurality of pulse control signals; and a current share network that is configured to develop a combined adjustment value and to adjust each of said plurality of ripple voltages by said combined adjustment value, wherein said combined adjustment value comprises a combination of a plurality of phase adjustment values, and wherein each of said plurality of phase adjustment values is based on a difference between a corresponding one of said plurality of ripple voltages and a reference voltage.

2. The phase current sharing network of claim 1, wherein:

each of said plurality of synthetic ripple networks comprises a corresponding one of a plurality of ripple capacitors that develops a corresponding one of said plurality of ripple voltages; and wherein said current share network comprises a plurality of transconductance amplifiers, each having a first input receiving said reference voltage, having a second input receiving a corresponding one of said plurality of ripple voltages, and having an output providing an adjust current to a corresponding one of said plurality of ripple capacitors.

3. The phase current sharing network of claim 2, wherein at least one of said plurality of transconductance amplifiers simulates a ripple resistor coupled between said reference voltage and said corresponding one of said plurality of ripple capacitors.

4. The phase current sharing network of claim 1, wherein:

each of said plurality of synthetic ripple networks comprises a corresponding one of a plurality of ripple capacitors that develops a corresponding one of said plurality of ripple voltages; and wherein said current share network comprises a plurality of adjustment networks, wherein each of said plurality of adjustment networks comprises a plurality of transconductance amplifiers, and wherein each of said plurality of transconductance amplifiers of each of said plurality of adjustment networks has a first input receiving said reference voltage, has a second input receiving a corresponding one of said plurality of ripple voltages, and has an output providing an adjust current to a corresponding one of said plurality of ripple capacitors.

5. The phase current sharing network of claim 4, wherein at least one of said plurality of transconductance amplifiers simulates a ripple resistor coupled between said reference voltage and said corresponding one of said plurality of ripple capacitors.

6. The phase current sharing network of claim 1, wherein each of said plurality of synthetic ripple networks comprises:

a ripple capacitor coupled between a supply node and a corresponding one of a plurality of ripple nodes developing a corresponding one of said plurality of ripple voltages;

a current sink that is coupled to sink a current proportional to the output voltage from said corresponding one of said plurality of ripple nodes; and a current source that is coupled to source a current proportional to the input voltage to said corresponding one of said plurality of ripple nodes when a corresponding one of the plurality of pulse control signals is active.

7. The phase current sharing network of claim 6, wherein said current share network comprises a transconductance network that is configured to convert a difference between each of said plurality of ripple voltages and said reference voltage into a corresponding plurality of adjustment currents that are applied to said corresponding one of said plurality of ripple nodes.

8. A current mode multiphase switching regulator for converting an input voltage to an output voltage, comprising:

a plurality of switching networks, each configured to switch current through a corresponding one of a plurality of inductors as controlled by a corresponding one of a plurality of switch control signals;

an error network which is configured to develop a trigger signal based on a relative error of the output voltage;

a plurality of synthetic ripple networks, each configured to develop a corresponding one of a plurality of ripple voltages that simulates a corresponding one of a plurality of phase ripple currents through a corresponding one of said plurality of inductors;

a plurality of first comparators, each configured to develop a corresponding one of a plurality of first control signals based on a corresponding one of said ripple voltages and used to determine timing of a first operative edge of a corresponding one of said plurality of switch control signals;

a plurality of second comparators, each configured to develop a corresponding one of a plurality of second control signals based on said trigger signal and a corresponding one of said ripple voltages and used to determine timing of a second operative edge of a corresponding one of said plurality of switch control signals; and a phase current sharing network that is configured to develop a combined adjustment value and to adjust each of said plurality of ripple voltages by said combined adjustment value, wherein said combined adjustment value comprises a combination of a plurality of phase adjustment values, and wherein each of said plurality of adjustment values is based on a difference between a corresponding one of said plurality of ripple voltages and a reference voltage.

9. The current mode multiphase switching regulator of claim 8, wherein:

each of said plurality of synthetic ripple networks comprises a corresponding one of a plurality of ripple capacitors that is coupled to develop a corresponding one of said plurality of ripple voltages; and wherein said phase current sharing network comprises a plurality of transconductance amplifiers, each having a first input receiving said reference voltage, having a second input receiving a corresponding one of said plurality of ripple voltages, and having an output providing an adjust current to a corresponding one of said plurality of ripple capacitors.

10. The current mode multiphase switching regulator of claim 9, wherein at least one of said plurality of transconductance amplifiers has a gain which simulates a ripple resistance coupled between said reference voltage and said corresponding one of said plurality of ripple capacitors.

11. The current mode multiphase switching regulator of claim 8, wherein said phase current sharing network comprises a transconductance network that is configured to convert a difference between each of said plurality of ripple voltages and said reference voltage into a corresponding plurality of adjustment currents that are applied to a corresponding one of said plurality of ripple nodes.

12. The current mode multiphase switching regulator of claim 8, wherein said phase current sharing network comprises a plurality of transconductance networks, and wherein each of said plurality of transconductance networks comprises a plurality of transconductance amplifiers that are configured to convert a difference between each of said plurality of ripple voltages and said reference voltage into a corresponding plurality of adjustment currents that are applied to a corresponding one of said plurality of ripple nodes.

13. The current mode multiphase switching regulator of claim 8, wherein each of said plurality of synthetic ripple networks comprises:
   a ripple capacitor coupled between a supply node and a corresponding one of a plurality of ripple nodes developing a corresponding one of said plurality of ripple capacitors;
   a current sink that is coupled to sink a current proportional to the output voltage from said corresponding one of said plurality of ripple nodes; and
   a current source that is coupled to source a current proportional to the input voltage to said corresponding one of said plurality of ripple nodes when a corresponding one of the plurality of pulse control signals is active.

14. The current mode multiphase switching regulator of claim 8, wherein said error network comprises an error amplifier which develops a compensation voltage which is used as said trigger signal.

15. The current mode multiphase switching regulator of claim 8, wherein said error network develops a window voltage, and wherein each of said plurality of first comparators comprises a window comparator which compares said window voltage with a corresponding one of said ripple voltages to develop a reset signal used to terminate a control pulse on a corresponding one of said plurality of switch control signals.

16. The current mode multiphase switching regulator of claim 8, wherein said error network develops said trigger value as a trigger voltage, and wherein each of said plurality of second comparators comprises a phase comparator which compares said trigger voltage with a corresponding one of said ripple voltages to develop a set signal used to initiate a control pulse on a corresponding one of said plurality of switch control signals.

17. A method of sharing current among phases of a current mode multiphase switching regulator, wherein the multiphase switching regulator develops a plurality of phase currents including a corresponding plurality of phase ripple currents through corresponding phase inductors as controlled by a corresponding plurality of pulse control signals for converting an input voltage to an output voltage, said method comprising:
   developing a plurality of ripple voltages, each simulating a corresponding one of the plurality of phase ripple currents;
   using each of the plurality of ripple voltages for developing a corresponding one of the plurality of pulse control signals;
   developing a plurality of adjustment values, each based on a difference between a reference voltage and a corresponding one of the plurality of ripple voltages; and
   applying each of the plurality of adjustment values to adjust each of the plurality of ripple voltages.

18. The method of claim 17, wherein said developing a plurality of ripple voltages comprises developing the plurality of ripple voltages on a corresponding plurality of ripple capacitors, where said developing a plurality of adjustment values comprises developing a plurality of adjustment currents, and wherein said applying each of the plurality of adjustment values comprises applying the plurality of adjustment currents to each of the plurality of ripple capacitors.

19. The method of claim 17, wherein said developing a plurality of adjustment values comprises amplifying a difference between the reference voltage and each of the ripple voltages and converting a plurality of amplified differences to a corresponding plurality of adjustment currents.

20. The method of claim 17, wherein:
   said developing a plurality of ripple voltages comprises continuously discharging each of a plurality of ripple capacitors by a current proportional to the output voltage and charging each of the plurality of capacitors by a current proportional to the input voltage during an active portion of a corresponding one of the plurality of pulse control signals;
   wherein said using each of the plurality of ripple voltages comprises comparing each of the plurality of ripple voltages with a control value based on a relative error of the output voltage;
   wherein said developing a plurality of adjustment values comprises developing a plurality of adjustment currents; and
   wherein said applying each of the plurality of adjustment values comprises applying each of the plurality of adjustment currents to each of the plurality of ripple capacitors.

* * * * *